(12) United States Patent
Altschul et al.

(10) Patent No.: US 6,351,629 B1
(45) Date of Patent: Feb. 26, 2002

(54) COMPACT MODULAR WIRELESS TELEPHONE

(75) Inventors: Randice-Lisa Altschul, Cliffside Park; Lee S. Volpe, Mount Laurel, both of NJ (US)

(73) Assignee: Dieceland Technologies Corp., Cliffside Park, NJ (US)

( * ) Notice: Subject to any disclaimer, the term of this patent is extended or adjusted under 35 U.S.C. 154(b) by 0 days.

(21) Appl. No.: 09/660,130

(22) Filed: Sep. 12, 2000

(51) Int. Cl.[7] .................................................. H04Q 7/20
(52) U.S. Cl. .......................... 455/90; 455/550; 455/568; 455/569; 455/575
(58) Field of Search .................. 455/90, 550, 568, 455/569, 572, 575; 379/428.01, 428.02, 428.04, 429, 430, 431, 433.01, 433.03, 433.05, 433.09, 434

(56) References Cited

U.S. PATENT DOCUMENTS

| | | | |
|---|---|---|---|
| 5,875,393 A | | 2/1999 | Altschul et al. |
| 5,965,848 A | | 10/1999 | Altschul et al. |
| 6,011,699 A | * | 1/2000 | Murray et al. ............... 455/575 |
| 6,061,580 A | * | 5/2000 | Altschul et al. ............ 455/575 |
| 6,212,414 B1 | * | 4/2001 | Alameh et al. ............. 455/575 |

* cited by examiner

*Primary Examiner*—Nay Maung
(74) *Attorney, Agent, or Firm*—Arthur Jacob

(57) ABSTRACT

A compact modular wireless telephone includes a telephonic module having a compact body member within which there is integrated basic wireless telephonic circuitry, and a remote modular arrangement having at least an earphone for connection to the telephonic module through an elongate cable which places the earphone at a remote location relative to the body member of the telephonic module. In addition to the earphone, the remote modular arrangement can include a microphone and a power source, both of which are removed from the body member to the remote modular arrangement. A loop antenna can be incorporated into the body member so that manipulation of the telephonic module will optimize reception of a wireless telephonic signal without disturbing the placement of the earphone at the ear of a user of the wireless telephone.

12 Claims, 4 Drawing Sheets

US 6,351,629 B1

COMPACT MODULAR WIRELESS TELEPHONE

The present invention relates generally to telephonic communications and pertains, more specifically, to a wireless telephone constructed in a compact modular arrangement.

The increasing popularity of wireless telephones, prompted by the widespread availability of cellular wireless telephone services, has led to a demand for more convenience and greater availability in wireless telephones and more economical wireless telephone use. The present invention places wireless telephone services within the easy reach of a greater population, thereby facilitating telephonic communication among increased numbers of people, in business and commercial fields as well as in domestic and personal uses.

The construction of highly compact and economical wireless telephones is described in detail in U.S. Pat. Nos. 5,875,393 and 5,965,848, granted to Altschul et al., the substance of which patents is incorporated herein by reference thereto. The present invention provides wireless telephones which are even more compact, and which are constructed for added versatility, convenience and safety in use, as well as for increased economy of manufacture. As such, the present invention provides several objects and advantages, some of which are summarized as follows: Provides a modular arrangement which allows the use of relatively less expensive modules in a wireless telephone suitable for more widespread use and acceptance; enables greater convenience in carrying about and using wireless telephones; reduces potential hazards associated with electromagnetic radiation emanating from wireless telephones; allows greater effectiveness in capturing wireless telephonic reception; provides greater versatility in the design and function of wireless telephones; enables the economical manufacture and distribution of relatively low-cost, reliable wireless telephones, thereby opening up new and larger markets for wireless telephones.

The above objects and advantages, as well as further objects and advantages, are attained by the present invention which may be described briefly as a compact modular wireless telephone comprising: a telephonic module consisting essentially of a body member having compact boundaries including a limited length, a limited width and a limited thickness, wireless telephonic operation circuitry within the body member for effecting the transmission and reception of wireless telephonic communications, selector apparatus integral with the body member for selective operation of the wireless telephonic operation circuitry, and body member electrical connector elements integral with the body member and electrically connected to the wireless telephonic operation circuitry; and a remote modular arrangement including an earphone, a power source, remote electrical connector elements complementary to the body member electrical connector elements, and elongate electrical conductors electrically connecting the earphone and the power source to the remote electrical connector elements, such that upon connection of the remote electrical connector elements to the body member electrical connector elements, the modular wireless telephone is enabled for wireless telephonic communications, with the earphone and the power source located remote from the telephonic module. In alternative constructions, the power source may be included in the telephonic module rather than in the remote arrangement, and a microphone may be placed either in the remote arrangement or in the body member of the telephonic module. Additionally, a loop antenna may be incorporated into the body member of the telephonic member, as a part of the wireless telephonic operating circuitry, for optimizing the reception of wireless telephonic signals.

The invention will be understood more fully, while still further objects and advantages will become apparent, in the following detailed description of preferred embodiments of the invention illustrated in the accompanying drawing, in which.

Figure 1:
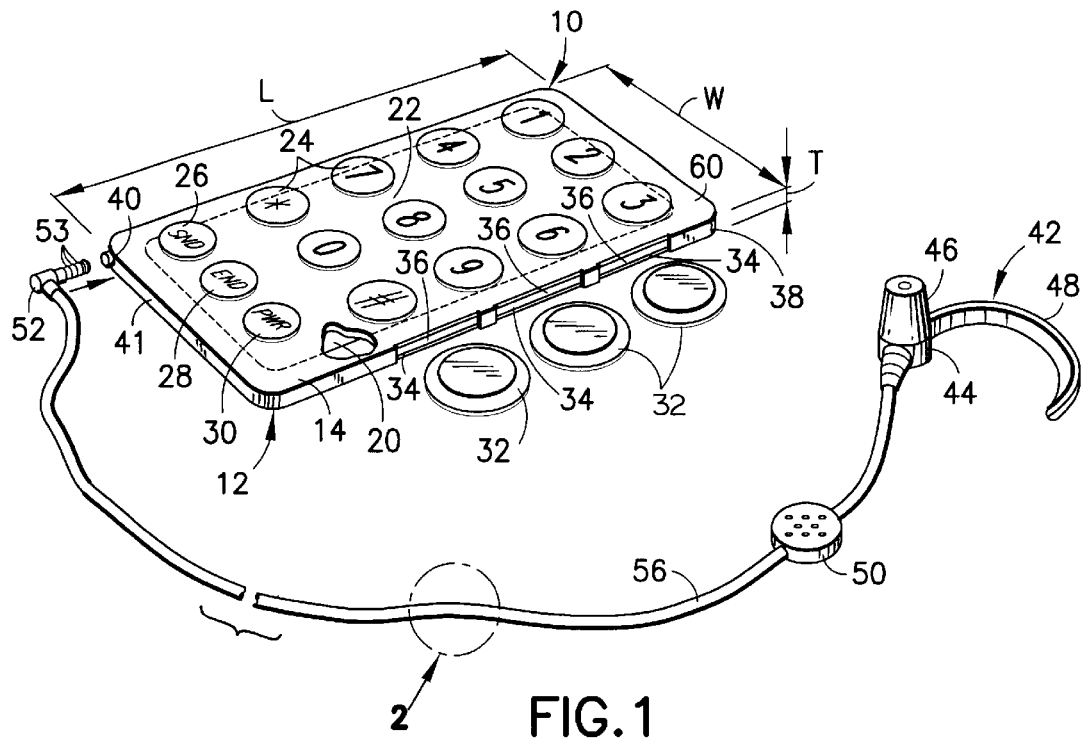
FIG. 1 is a partially diagrammatic pictorial front and side perspective view of a modular wireless telephone constructed in accordance with the present invention.
Figure 2:
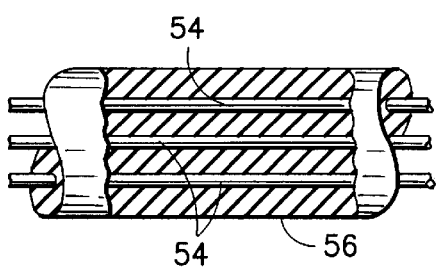
FIG. 2 is an enlarged sectioned view of portion 2 of FIG. 1.

Referring now to the drawing, and especially to FIGS. 1 and 2 thereof, a compact modular wireless telephone 10 is seen to include a telephonic module 12 which includes a body member 14 constructed in a manner similar to that demonstrated in the aforesaid U.S. Pat. Nos. 5,875,393 and 5,965,848 so as to have compact boundaries including a limited length L, a limited width W and a limited thickness T, these dimensions being approximately the same as corresponding dimensions of currently available credit cards. As described in the aforesaid patents, wireless telephonic operation circuitry 20 is incorporated within body member 14 for effecting the transmission and reception of wireless telephonic communications. Selector apparatus is shown in the form of a keypad 22 formed integral with body member 14 for selective operation of the wireless telephonic operation circuitry 20. Thus, keypad 22 includes number and symbol keys 24, as well as a "send" key 26, an "end" key 28, and a power switch key 30. A power source is shown in the form of batteries 32 which are inserted into power receptacles 34 having openings 36 along a side edge 38 of the body member 14, for connection to the wireless telephonic operation circuitry 20. Various battery types and styles are available for use in connection with body member 14. Thus, disk batteries, flat batteries and pouch batteries can be inserted readily into body member 14 to prepare wireless telephone 10 for use. Alternately, for long-term storage, a zinc-air battery may be included in body member 14 for activation only when it is desired to place the wireless telephone 10 into use. In addition, a printed battery can be incorporated directly into body member 14. Body member electrical connector elements are illustrated in the form of a female socket 40 integral with the body member 14 at one end 41 of the body member 14 and providing multiple electrical contacts connected to the wireless telephonic operating circuitry 20, in a manner well-known in electrical connectors.

A remote modular arrangement 42 includes a headset 44 having an earphone 46 mounted upon an ear clip 48, and a microphone 50, the earphone 46 and the microphone 50 being electrically connected to remote electrical connector elements shown in the form of a male plug 52 providing multiple electrical contacts 53 connected to the earphone 46 and the microphone 50 by means of respective elongate electrical conductors 54 in an elongate cable 56, the multiple electrical contacts 53 of the plug 52 being complementary to the multiple electrical contacts of the socket 40, as is known in electrical connectors.

Upon insertion of batteries 32 within corresponding receptacles 34, and connection of the plug 52 with the socket 40, wireless telephone 10 is made ready for use. With the headset 44 in place, the ear clip 48 is attached behind a user's ear (not shown), the earphone 46 is inserted into the ear, and the microphone 50 is placed adjacent the user's mouth (not shown), all at a location remote from the telephonic module 12 which is hand-held at a distance from the headset 44, by virtue of the elongate cable 56. The remote location not only provides added ease and convenience in the use of the wireless telephone 10, but also provides an added measure of safety in that any electromagnetic radiation emanating from the telephonic module 12 is far enough from the user's head (not shown) to avoid damage to the user. In general, the provision of a cable 56 having a length of twelve to thirty inches is sufficient to accomplish that end.

Figure 3:
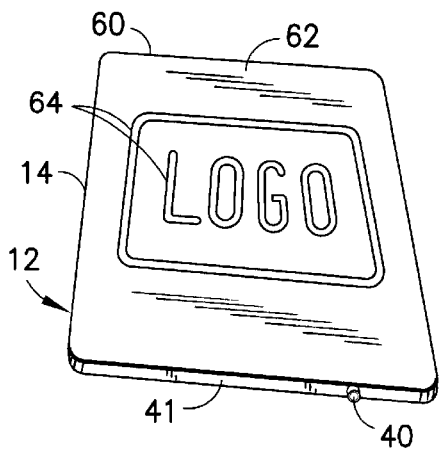
FIG. 3 is a pictorial rear and end view of a module of the modular wireless telephone.

Telephonic module 12 itself is rendered exceptionally compact by virtue of the inclusion of only the basic wireless telephonic operation circuitry 20 and keypad 22 necessary for enabling telephonic communications. In addition to the removal of the earphone 46 and the microphone 50 to a remote modular arrangement 42, certain other components usually present in wireless telephones, such as, for example, a display, an extendable antenna, a memory, and various support controls also are eliminated from the telephonic module 12, rendering the telephonic module 12 exceptionally compact, as well as economical to manufacture. The compact nature of the telephonic module 12, together with the uncluttered exterior thereof, readily accommodates the use of various colors, graphics and logos on the exterior 60 of the body member 14 of the telephonic module 12, thereby encouraging the distribution of wireless telephones 10 by a wider variety of distributors and retailers who can display proprietary identification in connection with wireless telephones incorporated into sales and promotional programs. Thus, as seen in FIG. 3, an entire rear panel 62 is made available for the display of indicia 64 identifying a particular seller of wireless telephone 10.

Figure 4:
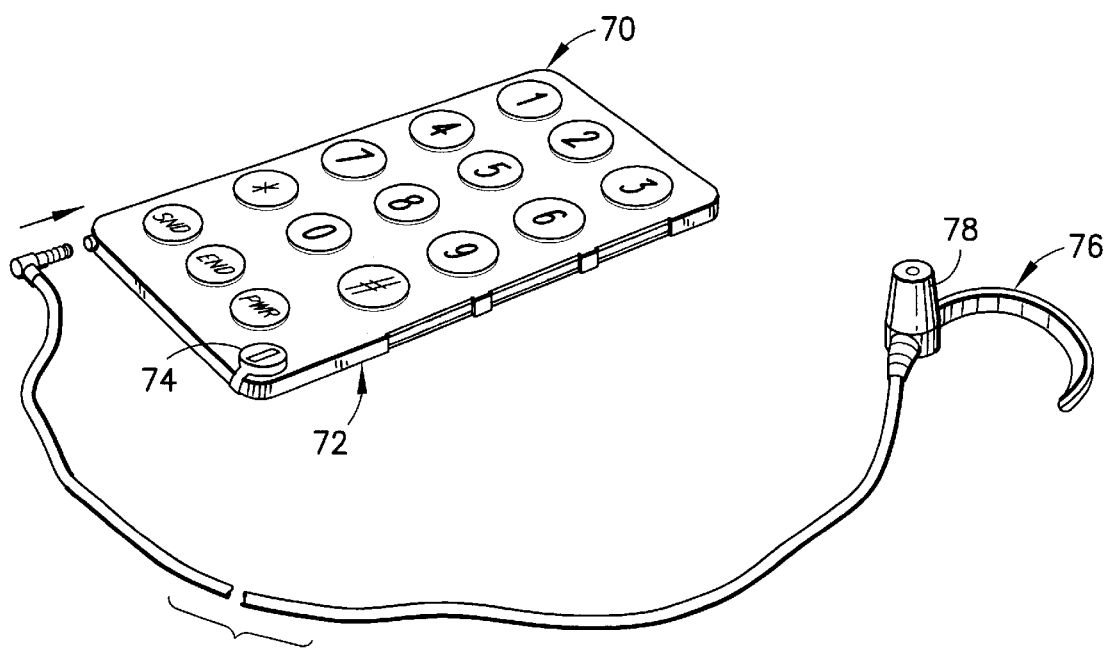
FIG. 4 is a pictorial perspective and partially diagrammatic view similar to FIG. 1 and showing an alternate construction.

In the embodiment of the invention illustrated in FIG. 4, a wireless telephone 70 is constructed similar to wireless telephone 10 described above, with the exception that telephonic module 72 includes an integral microphone 74, and remote modular arrangement 76 includes an earphone 78, but no microphone. As a result, telephonic module 72 is not quite as simplified or compact as telephonic module 12; however, many of the advantages of convenience and safety, as well as sales appeal, are retained.

Figure 5:
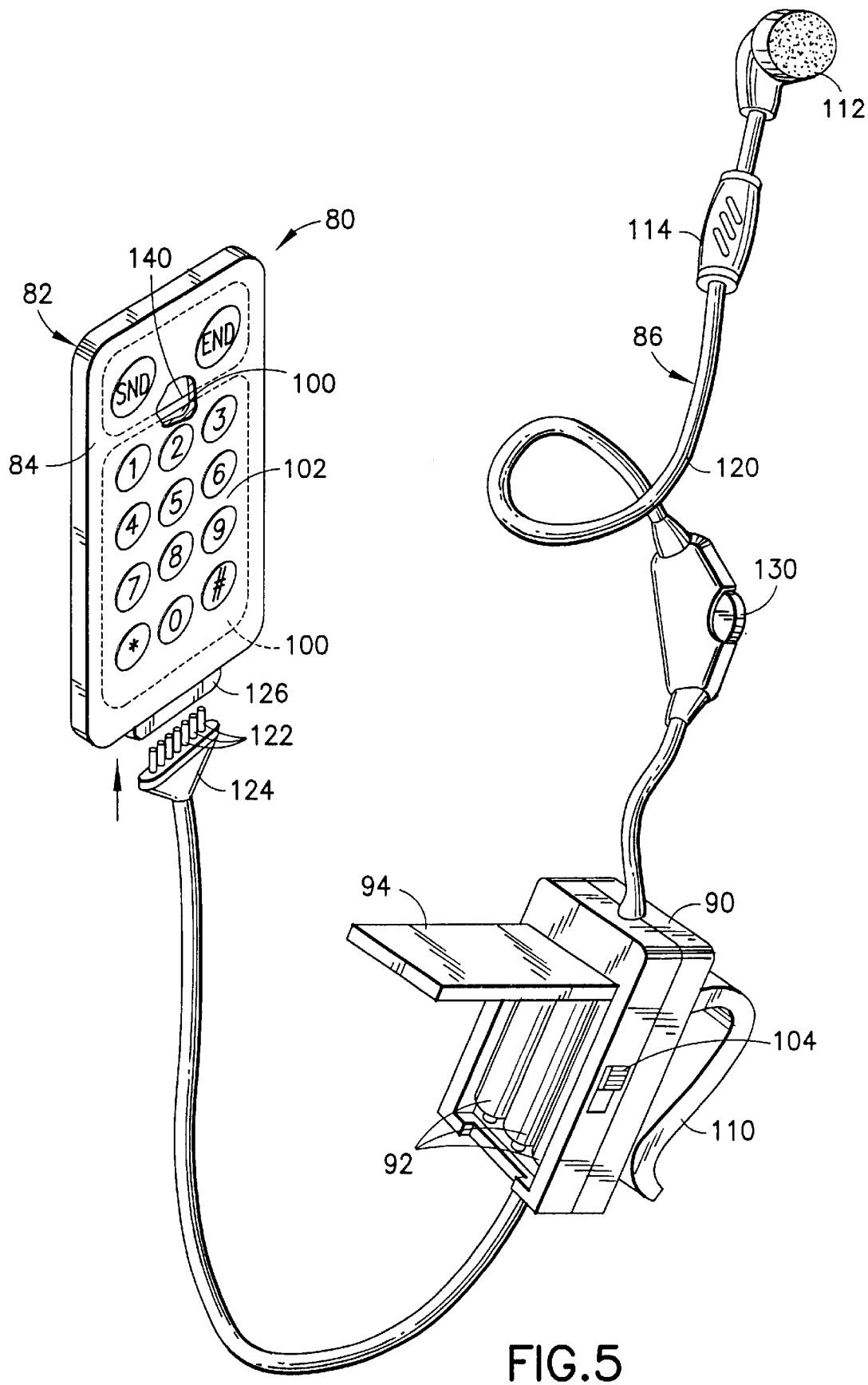
FIG. 5 is a partially diagrammatic pictorial view of another embodiment of the invention.

Turning now to the embodiment of FIG. 5, a wireless telephone 80 is provided with a further simplified telephonic module 82 in that the power source has been removed from the body member 84 of the telephonic module 82 to remote modular arrangement 86. Thus, remote modular arrangement 86 includes a battery case 90 for the reception of batteries 92 accessed through a door 94 which is selectively opened and closed for the insertion and retention of batteries 92. As before, the body member 84 of the telephonic module 82 includes wireless telephonic operating circuitry 100 and a keypad 102; however, added simplicity is attained by removal of a power switch which now is located at 104 on the battery case 90. Provision of a remote battery case 90 enables greater versatility in the selection of battery type and size, as well as facilitating battery changes. For added convenience, a belt clip 110 is integrated with the battery case 90.

Remote modular arrangement 86 includes an earphone 112 and a microphone 114, and an elongate cable 120 having multiple conductors electrically connects the earphone 112 and the microphone 114, as well as the battery case 90, to remote electrical connectors 122 of a male plug 124. A complementary female receptacle 126 is integral with the body member 84 and receives male plug 124 to complete the desired electrical connections between the cable 120 and the components within the body member 84. With the male plug 124 connected to the female receptacle 126, the earphone 112 is inserted directly into a user's ear (not shown), and the microphone 114 is placed in an appropriate location relative to the user's mouth (not shown). Actuation of the power switch 104 then enables use of the wireless telephone 80 for telephonic communications. For added convenience, a volume control 130 is provided adjacent the microphone 114.

As an additional feature, a loop antenna 140 is incorporated into the body member 84 of the telephonic module 82. The loop antenna 140 is highly effective in capturing a telephonic signal; however, the loop antenna 140 is directional and must be oriented generally perpendicular to an incoming signal for maximum efficiency. Since orientation of the telephonic module 82 is entirely independent of the placement of the remote modular arrangement 86, a user need merely manipulate the telephonic module 82, while the wireless telephone 80 is in use, to obtain an optimum orientation of the loop antenna 140 for maximizing the effectiveness of the loop antenna 140 in capturing an incoming telephonic signal.

Figure 6:
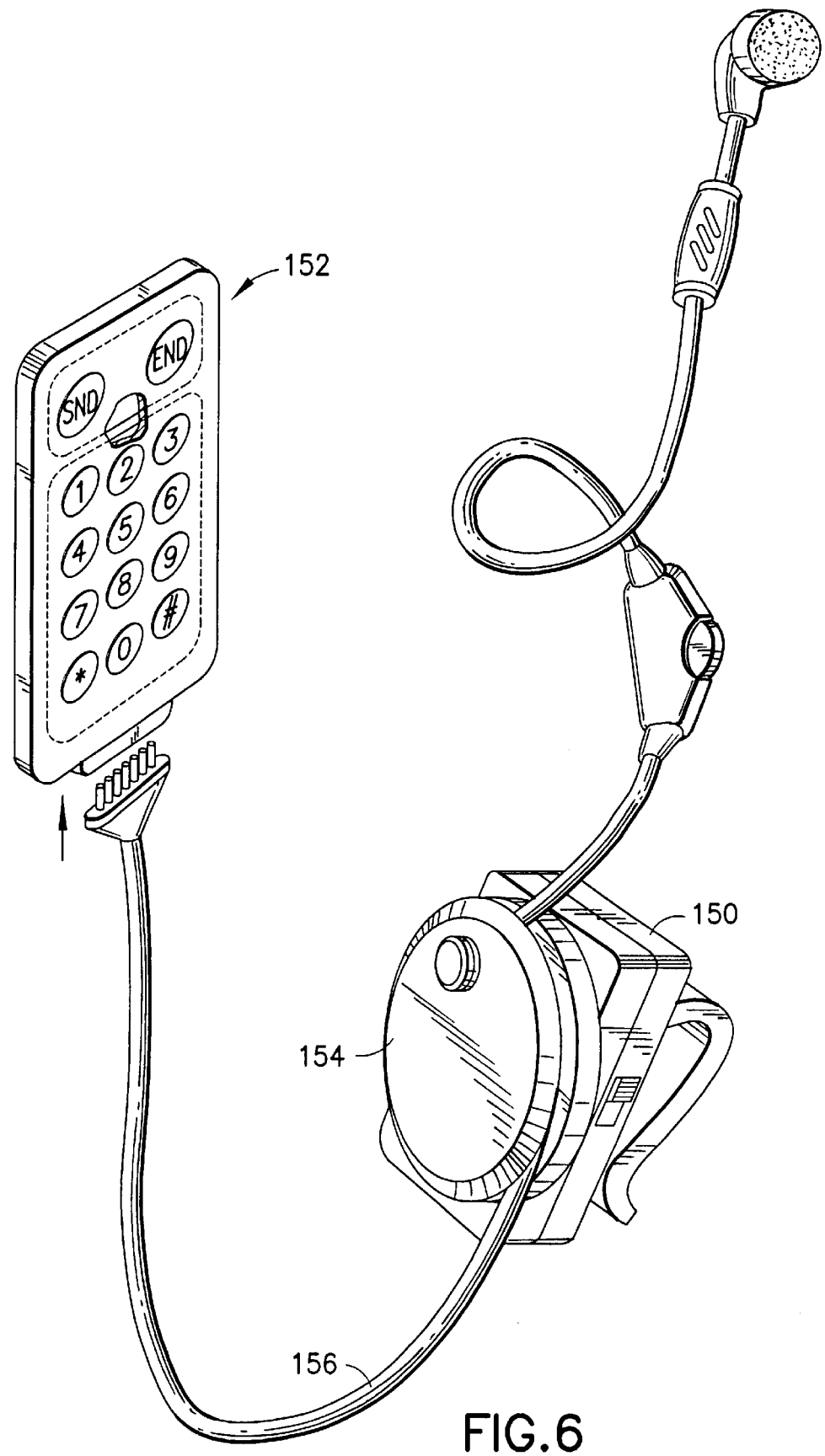
FIG. 6 is a pictorial view similar to FIG. 5 and showing still another embodiment of the invention.

In the embodiment of FIG. 6, a cable storage device has been incorporated into the battery case 150 of wireless telephone 152, the storage device being illustrated in the form of a storage reel 154 journaled on the battery case 150 for reeling multi-conductor cable 156 onto the storage reel 154 so that cable 156, when not in use, conveniently is stored in coils placed on the storage reel 154.

It will be seen that the present invention attains the several objects and advantages summarized above, namely: Provides a modular arrangement which allows the use of relatively less expensive modules in a wireless telephone suitable for more widespread use and acceptance; enables greater convenience in carrying about and using wireless telephones; reduces potential hazards associated with electromagnetic radiation emanating from wireless telephones; allows greater effectiveness in capturing wireless telephonic reception; provides greater versatility in the design and function of wireless telephones; enables the economical manufacture and distribution of relatively low-cost, reliable wireless telephones, thereby opening up new and larger markets for wireless telephones.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A compact modular wireless telephone comprising:
   a telephonic module consisting essentially of a body member having compact boundaries including a limited length, a limited width and a limited thickness, wireless telephonic operation circuitry within the body member for effecting the transmission and reception of wireless telephonic communications, selector apparatus integral with the body member for selective operation of the wireless telephonic operation circuitry, and body member electrical connector elements integral with the body member and electrically connected to the wireless telephonic operation circuitry; and a remote modular arrangement including an earphone, a power source, remote electrical connector elements complementary to the body member electrical connector elements, and elongate electrical conductors electrically connecting the earphone and the power source to the remote electrical connector elements, such that upon connection of the remote electrical connector elements to the body member electrical connector elements, the modular wireless telephone is enabled for wireless telephonic communications, with the earphone and the power source located remote from the telephonic module.

2. The invention of claim 1 wherein the remote modular arrangement includes a microphone and further elongate electrical conductors electrically connecting the microphone to the remote electrical connector elements.

3. The invention of claim 1 wherein the remote modular arrangement includes a battery case, and the power source comprises at least one battery for placement within the battery case.

4. The invention of claim 1 wherein the remote modular arrangement includes a storage device for selective storing of the elongate electrical conductors in a compact, coiled arrangement.

5. The invention of claim 4 wherein the storage device comprises a storage reel.

6. A compact modular wireless telephone comprising:

a telephonic module consisting essentially of a body member having compact boundaries including a limited length, a limited width and a limited thickness, wireless telephonic operation circuitry within the body member for effecting the transmission and reception of wireless telephonic communications, selector apparatus integral with the body member for selective operation of the wireless telephonic operation circuitry, the wireless telephonic operating circuitry including a loop antenna integral with the body member within the confines of the compact boundaries of the body member, and body member electrical connector elements integral with the body member and electrically connected to the wireless telephonic operation circuitry; and a remote modular arrangement including an earphone, a power source, remote electrical connector elements complementary to the body member electrical connector elements, and elongate electrical conductors electrically connecting the earphone and the power source to the remote electrical connector elements, such that upon connection of the remote electrical connector elements to the body member electrical connector elements, the modular wireless telephone is enabled for wireless telephonic communications, with the earphone and the power source located remote from the telephonic module.

7. The invention of claim 6 wherein the remote modular arrangement includes a microphone and further elongate electrical conductors electrically connecting the microphone to the remote electrical connector elements.

8. The invention of claim 6 wherein the remote modular arrangement includes a battery case, and the power source comprises at least one battery for placement within the battery case.

9. A compact modular wireless telephone comprising:

a telephonic module consisting essentially of a body member having compact boundaries including a limited length, a limited width and a limited thickness, wireless telephonic operation circuitry within the body member for effecting the transmission and reception of wireless telephonic communications, selector apparatus integral with the body member for selective operation of the wireless telephonic operation circuitry, a power source within the body member, and body member electrical connector elements integral with the body member and electrically connected to the telephonic operation circuitry; and a remote modular arrangement including an earphone, remote electrical connector elements complementary to the body member electrical connector elements, and elongate electrical conductors electrically connecting the earphone to the remote electrical connector elements, such that upon connection of the remote electrical connector elements to the body member electrical connector elements, the modular wireless telephone is enabled for wireless telephonic communications, with the earphone located remote from the telephonic module.

10. The invention of claim 9 wherein the remote modular arrangement includes a microphone and further elongate electrical conductors electrically connecting the microphone to the remote electrical connector elements.

11. A compact modular wireless telephone comprising:

a telephonic module consisting essentially of a body member having compact boundaries including a limited length, a limited width and a limited thickness, wireless telephonic operation circuitry within the body member for effecting the transmission and reception of wireless telephonic communications, selector apparatus integral with the body member for selective operation of the wireless telephonic operation circuitry, the wireless telephonic circuitry including a loop antenna integral with the body member within the confines of the compact boundaries of the body member, a power source within the body member, and body member electrical connector elements integral with the body member and electrically connected to the wireless telephonic operation circuitry; and a remote modular arrangement including an earphone, remote electrical connector elements complementary to the body member electrical connector elements, and elongate electrical conductors electrically connecting the earphone to the remote electrical connector elements, such that upon connection of the remote electrical connector elements to the body member electrical connector elements, the modular wireless telephone is enabled for wireless telephonic communications, with the earphone located remote from the telephonic module.

12. The invention of claim 11 wherein the remote modular arrangement includes a microphone and further elongate electrical conductors electrically connecting the microphone to the remote electrical connector elements.

* * * * *